July 30, 1963  O. R. ARCHER  3,099,474
CLAMPING DEVICE
Filed April 6, 1961  3 Sheets-Sheet 1

INVENTOR.
OSBORN R. ARCHER
BY Hudson, Boughton,
Williams, David & Hoffmann
ATTORNEYS July 30, 1963

O. R. ARCHER 3,099,474

CLAMPING DEVICE

Filed April 6, 1961

INVENTOR.
OSBORN R. ARCHER
BY Hudson, Coughton,
Williams, David & Hoffmann
ATTORNEYS July 30, 1963     O. R. ARCHER     3,099,474
CLAMPING DEVICE
Filed April 6, 1961     3 Sheets-Sheet 3
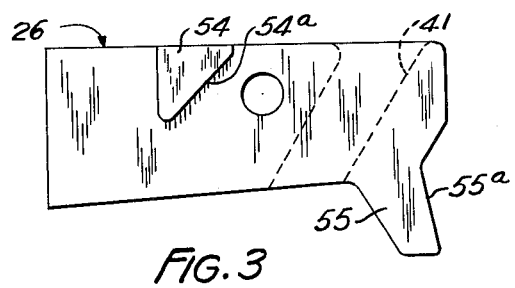
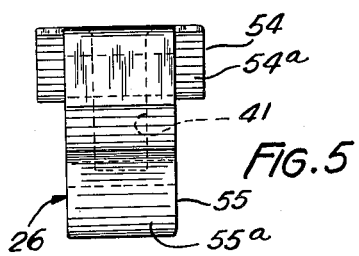
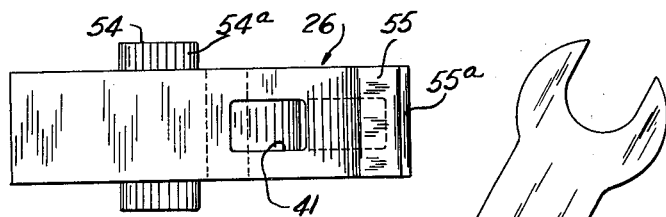
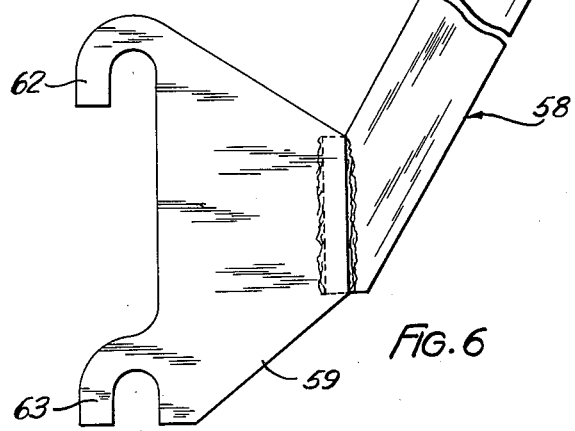
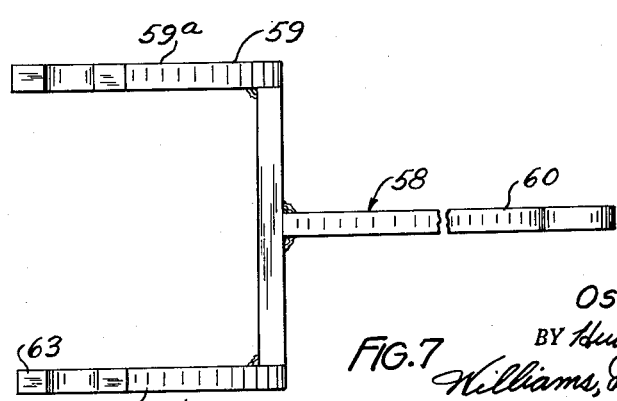
INVENTOR.
OSBORN R. ARCHER
BY Hudson, Boughton,
Williams, David & Hoffmann
ATTORNEYS

United States Patent Office 3,099,474
Patented July 30, 1963

3,099,474
CLAMPING DEVICE
Osborn R. Archer, Cleveland, Ohio, assignor to The American Ship Building Company, Cleveland, Ohio, a corporation of New Jersey
Filed Apr. 6, 1961, Ser. No. 101,227
19 Claims. (Cl. 292—256.5)

This invention relates to clamping devices and, more particularly, to a novel clamping device for use in securing removable cover means on an associated support.

The clamping device provided by this invention can be used to advantage wherever a cover means is subject to frequent removal and actuation of the clamping device with minimum manual effort and time expenditure is desirable. One use for which the clamping device hereof is well suited is for certain types of hatch covers on marine vessels and other cargo carrying vehicles. The invention is disclosed herein as applied to such a hatch cover use but without any intention of limiting the same precisely thereto.

An object of the invention is to provide a novel clamping device of a simple and practical construction capable of being readily installed, easily operated, and which produces a desired positive and effective clamping action.

Another object is to provide a novel clamping device of the character mentioned and which comprises a bracket member and a clamp member having guide opening means and guide stem means co-operably effective therebetween during movement of the clamp member toward its clamping position, and locking means actuatable to a locked condition for retaining the clamp member in its clamping position and the guide stem means engaged in the guide opening means.

A form of cover means with which the novel clamping device is usable to further advantage is one having top and depending side portions to which it is desirable to apply individual clamping forces and which side cover portion is disposed adjacent an upright portion of the cover support means when the cover means is in an applied position thereon. An example of this form of cover means is a conventional marine hatch cover frequently used on self-unloading marine vessels and having plate sections telescopingly slidable in a lateral direction and a tarpaulin, or like flexible sheet means, extending over the plate sections and down alongside the upright portion of the support means.

As a further object, this invention provides a novel clamping device of the type and for the kind of use above indicated, and wherein the clamp member has first and second thrust means for clamping engagement, respectively, with the top and side portions of the cover means.

Still another object is to provide a novel clamping device having angularly disposed dual thrust means engageable with top and side portions of a cover means in response to movement of a clamp member relative to a bracket member and along a guide axis provided by cooperably engageable guide opening means and guide stem means.

Additionally, this invention provides a novel clamping device of the kind referred to above and having actuatable locking means pivoted on the bracket member and connected with the clamp member by push-pull link means, the locking means preferably being of a toggle-action type.

Other objects, novel characteristics, and advantages of this invention will be apparent in the following detailed description and in the accompanying drawings forming a part of this specification and in which, FIG. 1 is mainly a side elevation of a clamping device of the novel construction provided by this invention but also shows portions of a support structure and a cover means in vertical section, the view being taken on section line 1—1 of FIG. 2;

FIG. 3 is a side elevation of the bracket member of the device in detached relation;

FIG. 4 is a bottom plan view of the bracket member;

FIG. 5 is an end view thereof;

FIG. 6 is a side elevation of an actuating tool applicable to the novel clamping device; and FIG. 7 is a bottom plan view of the tool.

Figure 1:
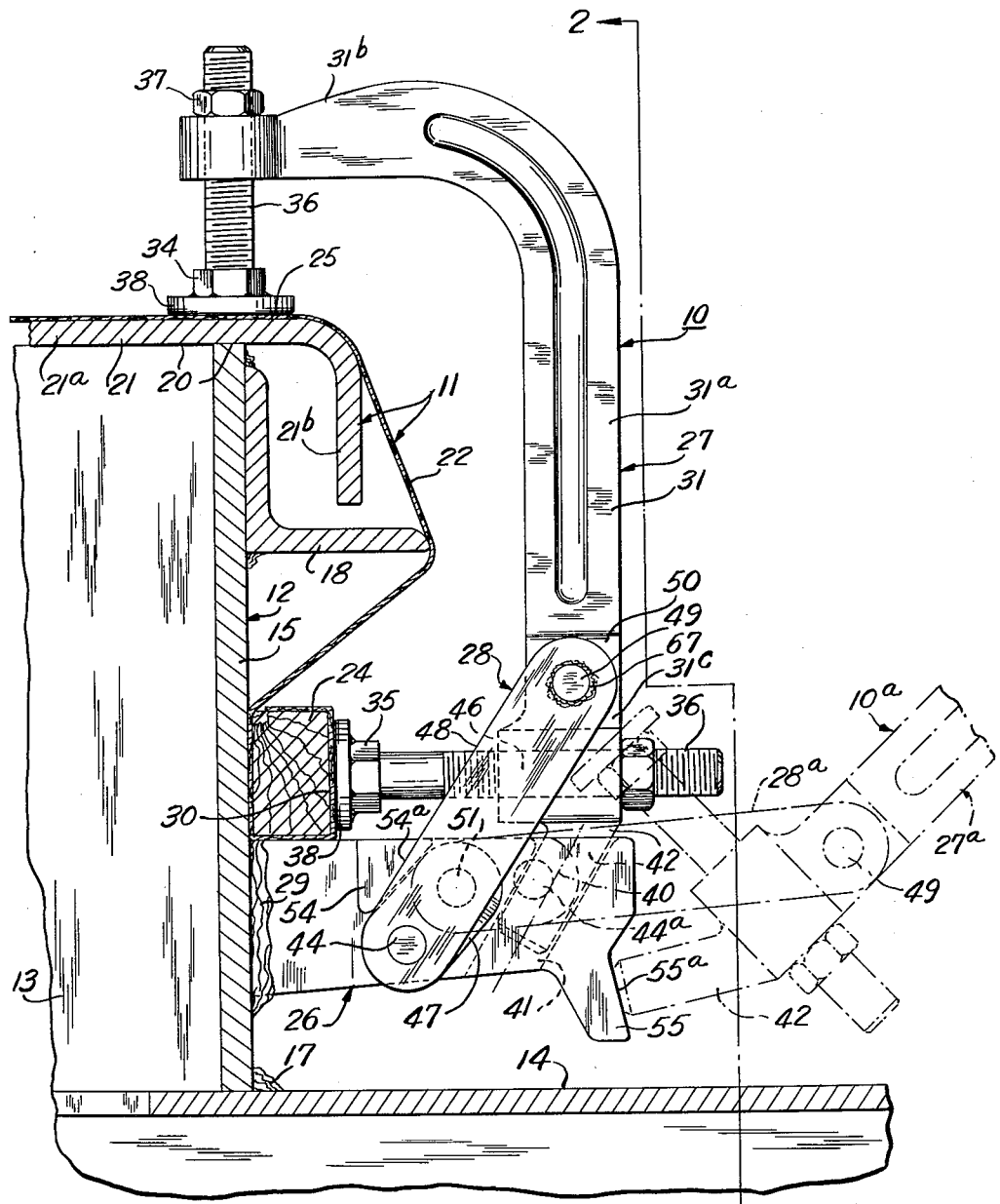

As one embodiment of this invention the drawings show the clamping device 10 thereof being used for removably securing a cover means 11 on a support structure 12 in a position closing an opening or passage 13 of the latter. The clamping device 10 is shown in full lines in FIGS. 1 and 2 in its cover-securing position and, in FIG. 1, is also shown in a phantom line cover releasing position 10$^a$.

Although the novel clamping device 10 is applicable to various different forms of cover means and support structures, the cover means 11 is here shown as being of the hatch-cover type and the support structure 12 is here shown as being a portion of a marine vessel on which the cover means 11 is used for closing a hatch opening. The support structure 12 comprises deck means 14 and an upright coaming 15 rising above the deck means and extending around the hatch opening. The coaming 15 is secured to the deck means 14 as by means of welds 17 and, in this case, also has an angle bar or the like 18 secured thereto at a point just below a cover seat 20 formed by the top edge of the coaming.

The cover means 11 is here shown as comprising plate means 21 resting on the seat 20 and a flexible cover sheet 22, such as a tarpaulin or the like, extending over the plate means 21 and having edge portions thereof carried downward adjacent or alongside of the coaming 15. The plate means 21 may comprise a unitary cover structure or, if desired, may comprise laterally telescopingly slidable cover plate members each having a substantially horizontal top wall 21$^a$ extending across the hatch opening 13 and depending flanges 21$^b$ at the ends thereof. In either case, the top portion of the plate means 21 provides a substantially horizontal clamping area 25 directly above the seat 20. Lower edge portions of the cover sheet 22 are preferably wrapped around conventional batten strips 24 for a purpose to be explained hereinafter and which batten strips extend in a horizontal direction alongside of the coaming 15.

The clamping device 10 comprises, in general, a bracket member 26, a clamp member 27, and a locking means 28 connected between the bracket member and clamp member and effective on the latter for retaining the same in clamping co-operation with the cover means 11. A plurality of the clamping devices 10 is usually provided in a spaced-apart relation along the coaming 15 for producing a clamping action on the cover means 11 at spaced points along the edge portions of the latter.

The bracket member 26 is attached to the coaming 15 as by means of a welded connection 29 and extends in a laterally projecting relation from the coaming at a suitable distance above the deck means 14. In addition to providing a support for the clamp member 27 and the locking means 28, the bracket member 26 also serves as a support for the batten strip 24 when the cover means 11 is in its applied position on the coaming 15. When the batten strip 24 is thus supported by the bracket member 26 it lies alongside the coaming 15 and the outer surface of the batten strip provides a substantially vertical second or lower clamping area 30.

The clamp member 27 comprises a body 31, in this case, a body having a vertically elongated substantially straight intermediate portion 31a and an upper end portion providing a laterally extending arm 31b which projects in a laterally inward and overhanging relation to the edge portion of the plate means 21 and the horizontal clamping area 25 of the latter. The lower end portion 31c of the clamp member 27 co-operates with the bracket member 26 in a manner which will be presently explained. It will be observed from FIG. 1 that the body 31 is of a generally C-shaped form and, if desired, this body can have a limited flexibility.

The clamp member 27 also comprises thrust means for applying the clamping force to the cover means 11 and which thrust means comprises a first or upper thrust means 34 on the arm portion 31b of the body 31 and a second or lower clamping, means 35 on the lower end portion 31c of such body. In the applied position of the clamping device 10, the first thrust means 34 applies downward clamping force to the thrust area 25 for pressing the cover means against the seat 20 and the second thrust means 35 applies clamping pressure in a lateral direction to the lower edge portion of the cover sheet 22 and to the batten strip 24 for clamping such sheet and batten strip against the coaming 15.

The upper and lower thrust means 34 and 35 each comprises a threaded stem 36 engaged in an internally threaded opening of the body 31 and a lock nut 37 applied to the stem for securing the same in a desired position of adjustment. Each of the thrust means 34 and 35 also comprises pad means 38 on the threaded stem 36 at the free end thereof for applying the clamping pressure in a distributed relation to the clamping area with which the thrust means co-operates. The thrust means 34 and 35 are individually adjustable to adapt the clamping device 10 to the particular cover means and support structure with which it is being used.

The bracket member 26 and the clamp member 27 have guide portions thereon which are co-operably effective along a common guide axis 40 during relative engaging and disengaging movements between these members. The guide portions of the two members comprising the bracket member 26 and the clamp member 27 consist of guide opening means on one of these members and guide stem means on the other of the members and receivable in such guide opening means.

In the drawings the guide portion of the bracket member 26 comprises such a guide opening means 41 which extends into or through this member from the upper side thereof. The guide portion of the clamp member 27 is here shown as being such a guide stem means 42 formed rigid with the body 31 and extending in a downwardly projecting relation from the lower end portion 31c. The guide opening means 41 and the guide stem means 42 are of a similar cross-sectional shape, preferably a quadrangular cross-sectional shape, so that the guide stem means and the clamp body 31 will be held in a nonrotatable relation when the stem means is engaged in the guide opening means.

The guide opening means 41 and the guide stem means 42 are so formed that the common guide axis 40 thereof extends in an inclined relation to the planes of one or both of the clamping areas 25 and 32 of the cover means 11 and, in this case, is shown as extending at an inclined relation of approximately 30 degrees to the plane of the coaming 15 and 60 degrees to the plane of the deck means 14. The inclination of the common guide axis 40 is in a downward and inward direction relative to the coaming 15 so that entering movement of the guide steam means 42 into the guide opening means 41 will result in a lateral movement of the lower thrust means 35 in a direction toward the coaming for increasing the clamping pressure being applied to the clamping area 30 as the upper thrust means 34 is being moved downward to apply pressure to the clamping area 25.

The locking means 28 forms a flexible connection between the clamp member 27 and the bracket member 26 and is movable to locking and unlocking positions. The locking means 28 is shown in its locking position in full lines in FIG. 1 and is shown in phantom lines in its unlocking position 28a. The locking means 28 comprises linkage means of the toggle-action type, to be presently described, and a portion of which has an over-center movement with respect to a median line 46 which extends substantially parallel to the common guide axis 40 when the clamping device 10 is in its applied position and locked condition.

The locking means 28 comprises actuatable means in the form of a pair of swingable link arms 47 lying on opposite sides of the bracket member 26, and push-pull connecting link means in the form of a pair of link members 48 having the upper ends thereof pivotally connected with the clamp member 27 by a pivot pin 49 extending through a bearing portion 50 of the body 31. The lower ends of the link members 48 are pivotally connected with the swingable link arms 47 by a pair of pivot pins 44 and 45 projecting from the latter.

The swingable link arms 47 are pivotally mounted on the bracket member 26 by being secured to the projecting ends of a pivot pin 51 which extends through the bracket member. The median line 46 extends through the pivot axes of the pivot pins 49 and 51, as shown in FIG. 1, and the portion of the locking means 28 having the above-mentioned over-center movement with respect to this median line is the pivotal connection formed by the pivot pins 44 and 45.

The location of the pivot pin 51 of the locking means 28 is in a laterally offset relation to the common guide axis 40 and on the side of the latter which is nearest to the coaming 15. The location of the pivot pin 51 in this position assists the movement of the guide stem means 42 into the guide opening means 41 during actuation of the locking means 28 to its locking position, as well as a lateral movement of the lower thrust means 35 in an inward direction against the batten strip 24. This location for the pivot pin 51 relative to the common guide axis 40 also has the effect of causing the upper thrust means 34 to remain in proper engagement with its associated clamping area 25 when this upper thrust means is pulled downward thereagainst during actuation of the locking means 28 to its locking position.

The bracket means 26 is provided with appropriate stop means, in this case, stop means in the form of laterally projecting lugs 54 on opposite sides thereof for limiting the movement of the locking means 28 in its locking direction. The lugs 54 have inclined stop faces 54a and are located so that these inclined stop faces will be engaged by edge portions of the link members 48, as shown in FIG. 1, when the locking means 28 has been fully actuated to its locking position. When the link members 48 are thus engaged with the stop lugs 54 the pivot means provided by the pins 44 and 45 will lie on the left side of the median line 46, as shown in FIG. 1, so that the toggle action of the locking means 28 will tend to retain the clamping device 10 in its fully applied and locked condition.

When the locking means 28 is actuated to its unlocking condition, the pivot pins 44 and 45 move across the median line 46 and swing upwardly and toward the right, as seen in FIG. 1, to the phantom line position 44a. This movement of the pivot pins 44 and 45 applies an upward pushing force to the link members 48 by which the guide stem means 42 is disengaged from the guide opening means 41 whereupon the clamp member 27 will be swingable on the pivot pin 49 to its phantom line position 27a in which the upper and lower thrust means 34 and 35 will have been retracted from their associated thrust areas 25 and 30 of the cover means 11.

It is desirable to prevent the clamp member 27 from dropping onto the deck means 14 when the clamp member has been actuated to its released position 27ª and, for this purpose, the bracket member 26 is provided with abutment means 55 which is engageable by the guide stem means 42 as shown in FIG. 1. The shape and location of the abutment means 55 are such that when the clamp member 27 swings to its retracted position 27ª, the free end of the guide stem means 42 seats against the surface 55ª of the abutment means. The clamp member 27 will then be supported in a parked position at a distance above the deck means 14 so as not to obstruct the deck area and so as to also be in a position from which it can be quickly and easily moved toward its full line clamping position when the cover means 11 is intended to be secured in place.

In thus moving the clamp member 27 from its parked position to its effetcive clamping position it need only be lifted and swung toward the coaming 15 and the guide stem means 42 inserted into the guide opening means 41. Thereupon the locking means 28 is actuated by swinging the pivot pins 44 and 45 across the median line 46 and toward the coaming 15 whereby the upper thrust means 34 will be pulled downward against its associated clamping area 25 and the lower thrust means 35 will be pushed laterally inward against its associated clamping area 30.

Figure 2:
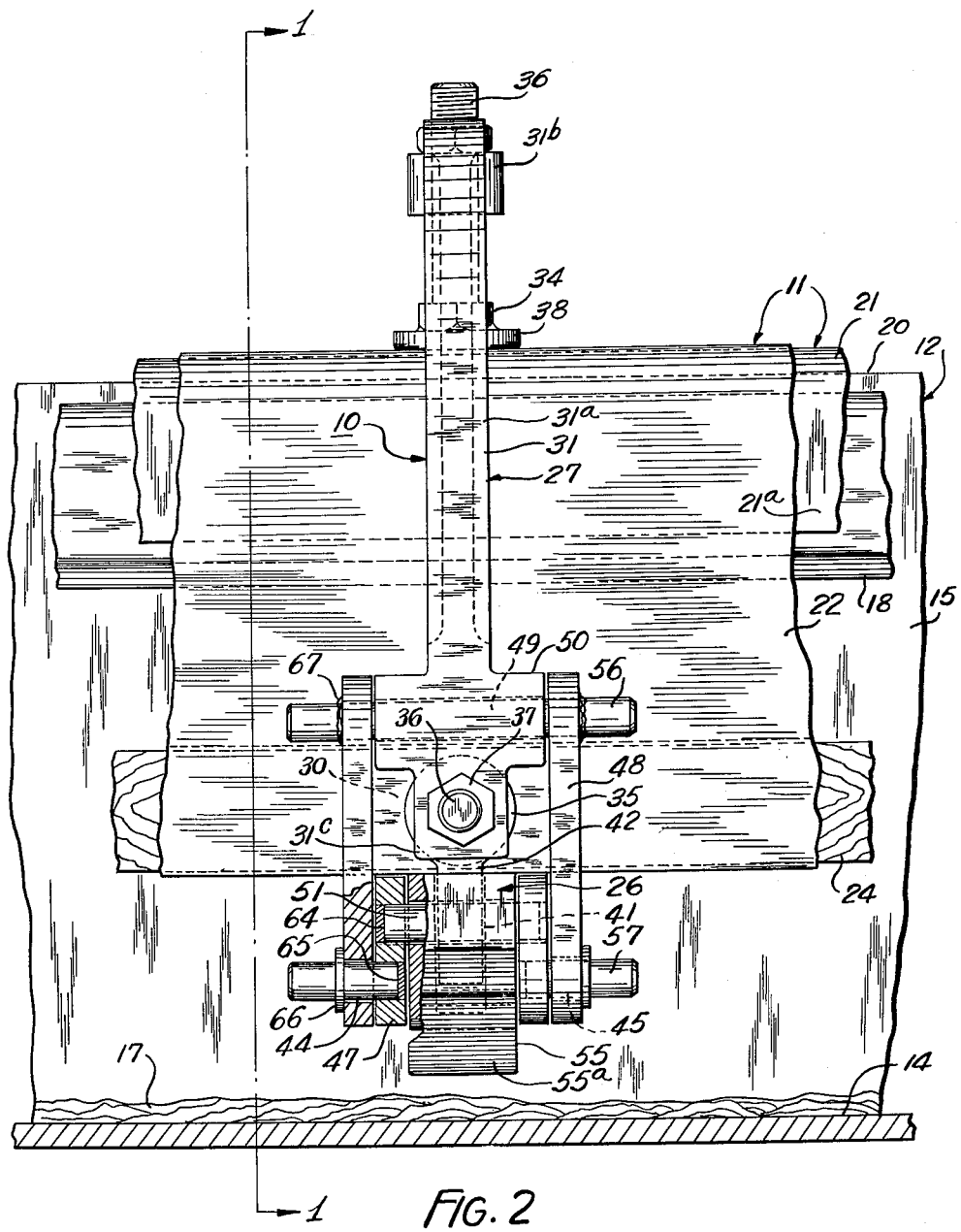
FIG. 2 is mainly a front elevation of the clamping device but also shows portions of the cover means and support structure, the view being taken as indicated by the direction line 2—2 of FIG. 1.

To facilitate the actuation of the locking means 28 in a manner just above described, the pivot pin 49 and the two pivot pins 44 and 45 are constructed so that end portions thereof project laterally beyond the exposed faces of the link members 48, as shown in FIG. 2, to constitute upper and lower tool engageable elements 56 and 57. The actuating force needed to move the locking means 28 to and from its locking position can be supplied by any suitable tool means, one form of which comprises a manually operable actuating lever 58 shown in FIGS. 6 and 7. The lever 58 comprises a lower base portion 59 of a forked form and an upper handle portion 60 secured to such base portion and extending in an upwardly and laterally inclined relation therefrom.

The forked lower portion 59 comprises spaced parallel yoke arms 59ª and 59ᵇ having upper and lower hook-shaped elements 62 and 63 thereon. The spacing of the yoke portions 59ª and 59ᵇ is such that these portions will be movable past the link members 48 on the outer sides thereof when the tool 58 is applied to the locking means 28, and the shape and location of the hook elements 62 and 63 are such that these elements will thereupon be readily engageable with the projecting pin elements 56 and 57 for connecting the tool with the locking means. By swinging of the handle portion 60 in the appropriate directions, the link arms 47 will be swung about the axis of the pivot pin 51 to actuate the locking means 28 to its locking and unlocking conditions.

As shown in FIG. 2, the link arms 47 are secured to the end portions of the pivot pin 51 as by means of plug welds 64 and the two pivot pins 44 and 45 have their inner ends secured in the link arms 47 by similar plug welds 65. The pivot pins 44 and 45 are here shown as provided with collars 66 lying against the outer faces of the link members 48 for retaining the latter in an adjacent relation to the link arms 47. The upper ends of the link members 48 are here shown as being secured on end portions of the pivot pin 49 by suitable welds 67.

From the accompanying drawings and the foregoing detailed description it will now be readily understood that this invention provides novel clamping means by which cover means can be quickly and easily secured in place on an associated support structure. Since the novel construction, characteristic features and advantages of the novel clamping device have already been pointed out and described hereinabove, they need not be repeated at this point.

Although the novel clamping device of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. A clamping device for clamping a movable cover against a support; comprising a bracket member adapted to be attached to said support; a movable clamp member having thrust means engageable with said cover; one of said members having guide opening means and the other member having guide stem means rigid therewith and receivable in said guide opening means, and connecting means connecting said clamp member with said bracket member for an initial closing swinging movement of the clamp member to locate said thrust means in a given presentment position relative to said cover; said guide opening means and guide stem means being co-operably engageable by a subsequent translatory movement of said clamp member relative to said bracket member and in a direction to engage said thrust means with said cover; said guide stem means being effective, in response to the engaged condition thereof with said guide opening means, to prevent tilting of said clamp member away from said presentment position while permitting said subsequent translatory movement; said connecting means comprising toggle action type locking means movable to a locking position during said subsequent translatory movement of said clamp member for holding said thrust means engaged with said cover and holding said guide stem means and guide opening means in their co-operably engaged relation.

2. A clamping device for clamping a movable cover against a support; comprising a bracket member adapted to be attached to said support; a movable clamp member having thrust means engageable with said cover; one of said members having guide opening means and the other member having guide stem means rigid therewith and receivable in said guide opening means; said guide opening means and guide stem means being co-operably engageable in response to movement of said clamp member relative to said bracket member in a direction to engage said thrust means with said cover; and locking means connecting said clamp member with said bracket member and actuatable from an unlocked condition to a locked condition for retaining said thrust means in clamping engagement with said cover and said guide stem means engaged in said guide opening means; said locking means comprising swingable link means having a first pivotal connection with said bracket member, and connecting link means having second and third pivotal connections with said clamp member and swingable link means for over-center movement of said second pivotal connection to produce said locked and unlocked conditions.

3. A clamping device for clamping a movable cover against a support; comprising a bracket member adapted to be attached to said support; a movable clamp member having thrust means engageable with said cover; one of said members having guide opening means and the other member having guide stem means rigid therewith and receivable in said guide opening means; said guide opening means and guide stem means being co-operably engageable to connect said clamp member with said bracket member in response to translatory movement of said clamp member relative to said bracket member in a direction to engage said thrust means with said cover; swingable arm means having a first pivotal connection with said bracket member; a second pivot means carried by said arm means and swingable thereby; and connecting link means having one end thereof connected with said second pivot means and the other end thereof connected with said clamp member by a third pivot means; said swingable arm means and said connecting link means comprising a locking means movable to locking and unlocking positions by over-center swinging of said second pivot means across a median line extending through the axes of said first and third pivot means when said guide stem means is engaged in said guide opening means.

4. A clamping device for use with closure structure comprising a support and an associated movable cover means having a clamping area comprising; a bracket member adapted to be attached to said support; a movable clamp member having thrust means located thereon for clamping engagement with said clamping area; co-operable guide means on said members comprising a guide opening means and a guide stem means receivable therein; the guide means of said bracket member providing a guide axis extending in an intersecting relation to the plane of said clamping area when said cover means is on said support, and said guide stem means being rigid with its associated member; said guide stem means being movable into said guide opening means in response to movement of said clamp member along said guide axis in a direction to engage said thrust means with said clamping area; push-pull link means pivotally connected with said clamp member; and locking means pivoted on said bracket member for movement to locking and unlocking positions and operably connected with said link means for transmitting pushing and pulling forces therethrough to said clamp member; said locking means when in said locking position being effective through said push-pull link means to hold said thrust means engaged with said clamping area and said guide stem means co-operably engaged with said guide opening means.

5. A clamping device for clamping a movable cover against a support; comprising a bracket member adapted to be attached to said support; a movable clamp member comprising a body having thrust means engageable with said cover for applying clamping thrust thereto; one of said members having guide opening means and the other member having guide stem means rigid therewith and receivable in said guide opening means; said guide opening means and guide stem means being co-operably engageable to connect said clamp member with said bracket member in response to translatory movement of said clamp member relative to said bracket member in a direction to engage said thrust means with said cover; locking means comprising actuatable means mounted on said bracket member and pivotally movable to locking and unlocking positions; and push-pull connecting link means connected between said actuatable means and said clamp member and operable to transmit thrust in opposite directions to the latter in response to movement of said actuatable means to said locking and unlocking positions; the thrust transmitted to said clamp member in one direction by said link means being effective to cause clamping action of said thrust means against said cover and to maintain said guide stem means engaged in said guide opening means, and the thrust transmitted in the opposite direction being effective to cause disengaging movement of said thrust means relative to said cover and disengaging movement between said guide stem means and said guide opening means.

6. A clamping device for use with closure structure comprising a support and an associated movable cover means; comprising a bracket member adapted to be attached to said support; a movable clamp member; first and second thrust means on said clamp member and disposed so as to be engageable with different clamping areas of said cover means lying in angularly disposed first and second planes; one of said members having guide opening means and the other having guide stem means receivable in said guide opening means; said guide opening means and said guide stem means being co-operably engageable on a common guide axis extending in an inclined relation to said second plane in response to movement of said clamp member along said guide axis in a direction for causing said first and second thrust means to engage said clamping areas; and locking means comprising pivoted link means connected between said bracket member and clamp member and actuatable from a locking condition effective to retain said guide stem means engaged in said guide opening means to an unlocking condition with said guide stem means disengaged from said guide opening means.

7. A clamping device for use with closure structure comprising a support and an associated movable cover means having angularly disposed first and second clamping areas comprising; a bracket member adapted to be attached to said support; a movable clamp member comprising a body having first and second thrust stems projecting therefrom in substantially the same angular relation to each other as the angular relation between said clamping areas; first and second thrust means on said first and second thrust stems; co-operable guide means on said members comprising a guide opening means and a guide stem means receivable therein; the guide means of said bracket member providing a guide axis extending in an intersecting relation to the plane of at least one of said clamping areas when said cover means is on said support, and said guide stem means being rigid with its associated member; said guide stem means being movable into said guide opening means in response to movement of said clamp member along said guide axis in a direction to engage said first and second thrust means with said first and second clamping areas; and locking means comprising pivoted link means swingably connecting said clamp member with said bracket member and actuatable from a locking condition effective to retain said guide stem means engaged in said guide opening means to an unlocking condition with said guide stem means disengaged from said guide opening means.

8. A clamping device as defined in claim 7 wherein said locking means comprise push-pull link means pivotally connected with said body; and actuatable means pivoted on said bracket member for movement to locking and unlocking positions and operably connected with said link means for transmitting pushing and pulling forces through the latter to said clamp member.

9. A clamping device for use with a substantially upright support means and an associated movable cover means having a top portion providing a first clamping portion, and a side portion depending from said top portion and providing a second clamping portion in an angular relation to said first clamping portion comprising; a bracket member adapted to be attached to said support means to extend in a laterally projecting relation thereto; a movable clamp member comprising a body having first and second thrust stems projecting therefrom in substantially the same angular relation as that between said first and second clamping portions; first and second thrust means on said first and second thrust stems; co-operable guide means on said members comprising a guide opening means and a guide stem means receivable therein; the guide means of said bracket member providing a guide axis extending in an inclined direction downwardly and laterally relative to said support means, and said guide stem means being rigid with its associated member; said guide stem means being movable into said guide opening means in response to movement of said clamp member along said guide axis in a direction to engage said first and second thrust means with said first and second clamping portions; and locking means comprising pivoted link means swingably connecting said clamp member with said bracket member and actuatable from a locking condition effective to retain said guide stem means engaged in said guide opening means to an unlocking condition with said guide stem means disengaged from said guide opening means.

10. A clamping device as defined in claim 9 wherein said guide opening means is in said bracket member and said guide stem means is on the body of said clamp member.

11. A clamping device as defined in claim 9 wherein said first and second thrust stems comprise threaded portions providing adjustable connections between said thrust stems and said body.

12. A clamping device as defined in claim 9 wherein said body is provided at the upper end thereof with an arm portion carrying said first thrust stem and adapted to extend laterally above said top portion of the cover means, and said guide opening means is in said bracket member; said guide stem means being on the lower end of said body and projecting therefrom.

13. A clamping device as defined in claim 9 wherein the side portion of said cover means comprises flexible sheet material and an associated batten strip; said first thrust stem and said first thrust means being carried by the upper end portion of said body, and said guide stem means and said second thrust stem being on the lower end portion of said body.

14. A clamping device as defined in claim 9 wherein said guide opening means is in said bracket member and said guide stem means is on the body of said clamp member; said bracket member having abutment means thereon engageable by said guide stem means in response to swinging movement of said bracket member on said link means in a direction away from said support means after disengagement of said guide stem means from said guide opening means.

15. A clamping device as defined in claim 9 wherein said bracket member has stop means thereon engageable by said link means for limiting the actuatable movement of the latter in the locking direction.

16. A clamping device as defined in claim 15 wherein said stop means comprises stop elements on opposite sides of said bracket member, and said link means comprises a pair of link members on opposite sides of said bracket member and engageable with said stop elements for limiting the actuatable movement of said link means in the locking direction.

17. A clamping device as defined in claim 9 wherein said link means comprises a pair of connecting links on opposite sides of said bracket member, and pivot pin portions projecting from said links at spaced points therealong for the application of actuating tool means to said link means.

18. A clamping device according to claim 1 wherein said connecting means comprises toggle-action link means and the movement of said locking means to locking position is an overcenter movement of said toggle-action link means.

19. A clamping device according to claim 1 wherein the cross-sectional shape of said guide opening means and guide stem means is noncircular for preventing pivotal movement therebetween.

References Cited in the file of this patent
UNITED STATES PATENTS

| | | |
|---|---|---|
| 2,088,100 | Watson | July 27, 1937 |
| 2,261,557 | Matthews | Nov. 4, 1941 |
| 2,636,766 | Matthews | Apr. 28, 1953 |